United States Patent Office 3,113,068
Patented Dec. 3, 1963

3,113,068
AROMATIC ETHYNYL PESTICIDES
John H. Wotiz, Mentor, Ohio, assignor to Diamond Alkali Company, Cleveland, Ohio, a corporation of Delaware
No Drawing. Filed Sept. 19, 1960, Ser. No. 53,864
34 Claims. (Cl. 167—30)

This invention relates to ethynyl benzenes and substituted ethynyl benzenes, their preparation and uses.

This is a continuation-in-part of my co-pending application Serial No. 849,137, filed October 28, 1959, now abandoned.

The ethynyl benzenes of this invention have the general structure:

$$R'_n—R—C≡C—X$$

wherein R is aryl, such as

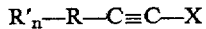 or 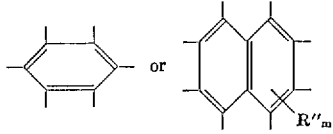

R' and R" are selected from the group consisting of halogen, lower alkyl and lower alkoxy; X is selected from the group consisting of hydrogen, halogen and phenyl; $n$ is a number from 0 to 5, inclusive; $m$ is a number from 0 to 2, inclusive; and any free bonds are satisfied by hydrogen; i.e., R and R' comprise a substituted aryl radical such as a phenyl or naphthyl radical wherein the phenyl radical may have 0 to 5 hydrogen atoms substituted by halogen, lower alkyl, lower alkoxy or a combination thereof and the naphthyl radical may have 0 to 7 hydrogen atoms substituted by halogen, lower alkyl, lower alkoxy or a combination thereof.

These compounds exhibit a high degree of biological activity, i.e., they are active as nematocides, fungicides, bactericides, herbicides and insecticides.

Novel compounds within the above general structure have the formula:

$$R'_n—R—C≡C—X$$

wherein R is aryl, such as

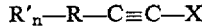 or 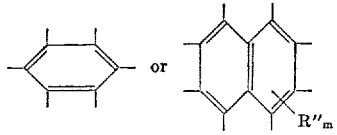

R', R" and X are halogen; $n$ is a number from 0 to 5, inclusive; $m$ is a number from 0 to 2, inclusive; and any free bonds are satisfied by hydrogen, i.e., R and R' comprise a halogenated aryl radical such as a phenyl or naphthyl radical wherein the phenyl radical may have 0 to 5 hydrogen atoms substituted by halogen atoms and the naphthyl radical may have 0 to 7 hydrogen atoms substituted by halogen atoms.

The ethynyl benzenes of this invention can be prepared by reacting a Grignard reagent, such as chlorophenyl magnesium bromide, phenyl magnesium chloride, methylphenyl magnesium bromide, naphthyl magnesium bromide or fluorophenyl magnesium bromide, with dihaloacetylene, e.g., dichloroacetylene, wherein the Grignard reagent is added to the dihaloacetylene in ethyl ether solution. In general, the reactants are gradually combined, using approximately stoichiometric amounts, at a rate sufficient to maintain a gentle reflux of the ether.

The compounds of this invention can also be prepared by halogenating styrene by contacting it with gaseous halogen, maintaining a temperature within the range of about 0° to 100° C. The side-chain halogenation may be catalyzed by illumination and is continued until 3 atoms of halogen have been added to the side-chain.

Halogen is added to the ring by adding a metallic catalyst such as ferric chloride and passing more halogen into the apparatus. This reaction may be continued until the desired number of halogen atoms have been added to the nucleus.

The halogenated compound is dissolved in an alcohol, such as ethanol, and dehydrohalogenated by the application of heat or the addition of a basic material such as sodium hydroxide, sodium carbonate, sodium ethylate or sodium amide in an appropriate solvent. This reaction is continued until the equivalent of 2 mol of hydrogen halide have been removed from the side-chain to produce haloethynylhalobenzene.

In using the ethynyl benzenes of this invention as nematocides, fungicides, bactericides, herbicides or insecticides, they can be applied as such or they can be extended with a liquid or solid diluent or carrier. The compounds of this invention can, for example, be combined or formulated into suitable compositions for spraying or drenching or, if desired, employed as an emulsifiable concentrate. Alternatively, the compounds can, of course, be formulated into appropriate use compositions by mixing a toxic amount thereof with a conditioning agent of the kind used and referred to in the art of pest control as an adjuvant.

Biologically-active compositions embodying the compounds of this invention can be prepared in the form of solids or liquids. Solid compositions, preferably in the form of wettable powders, are compounded to give homogeneous free-flowing powders by mixing the active ingredient with finely-divided solids, Attaclays, diatomaceous earth, fine silica or flours, such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents, such as granular Attaclay, or may be made by first extending the powdered solid with a powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The biologically-active compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulas), alkyl naphthalene sodium sulfonate and other wetting, dispersing and emulsifying agents such as those listed in articles by McCutcheon in "Soap and Chemical Specialties," vol. 31, Nos. 7–10 (1955), including, for example, the material known as Triton X–155 (100% alkylaryl polyether alcohol—U.S. Patent No. 2,504,064).

Generally, the surface-active agent will not comprise more than about 5% to 15% by weight of the composition depending, of course, upon the particular surface-active agent, the system in which it is placed, and the result desired; in certain compositions, the percentage will be 1% or less. Usually, the minimum concentration will be 0.1%.

The active compound is, of course, applied in an amount sufficient to exert the desired biological action. The amount of the active ingredient present in the compositions as actually applied will vary with the manner of application, the particular pests for which control is sought, the purposes for which the application is being made, and like variables. In general, however, the pesticidal compositions will contain from about 0.5% to 85% by weight of the active ingredient.

Fertilizer materials, herbicidal agents and other pest control agents such as other insecticides and fungicides can be included in the pesticidal compositions of the invention if desired.

The term "carrier" as employed in the specification and claims is intended to refer broadly to the materials constituting a major proportion of a biologically-active material or other formulation and hence includes finely-divided materials, both liquids and solids, as aforementioned, conventionally used in such applications.

In order that those skilled in the art may more completely understand the present invention and the preferred methods by which the same may be carried into effect, the following specific examples are offered.

EXAMPLE 1

*Preparation of p-(2-Chloroethynyl)Chlorobenzene*

A solution of dichloroacetylene in ether is prepared essentially as described by Ott, Ber., 75, 1517 (1942), i.e., by passing trichlorethylene and ethyl ether over potassium hydroxide, heating to 130° C. and fractionating the dichloroacetylene and ether to remove them from unreacted trichloroethylene. The Grignard reagent, p-ClC$_6$H$_4$MgBr is prepared in 90% yield by reacting 135 g. (0.75 mol) of p-ClC$_6$H$_4$Br with 25 g. of magnesium in 500 ml. of ether.

Chloroethynylation is accomplished in a 2-liter, three-necked flask, fitted with condenser, addition funnel and stirrer, under an atmosphere of nitrogen, by the addition of 0.42 mol of p-ClC$_6$H$_4$MgBr in 375 ml. of ethyl ether to 160 ml. of an ethyl ether solution which contains 0.6 mol of C$_2$Cl$_2$. The reaction is exothermic and the rate of addition is controlled so as to maintain a gentle reflux of the ether. The reaction mixture produces a solid precipitate as well as an oily heavy layer. After the addition of 200 ml. of the p-ClC$_6$H$_4$MgBr, the reaction mixture is diluted with an additional 200 ml. of dry ethyl ether to maintain fluidity. When the reaction mixture temperature drops to 25° C., a sample is tested and is found to be free of unreacted Grignard reagent (Gilman's test). The reaction products are then hydrolyzed with concentrated NH$_4$Cl solution (200 ml.), the organic layer separated and filtered to free it from brown, insoluble solids. The ether solution is dried over anhydrous K$_2$CO$_3$ and the ether removed by distillation. The brown-colored crude product (47 g., 65% yield) melts from 69°–71° C. It is purified by boiling a hexane solution thereof with activated charcoal and finally by sublimation at 60° C. under 0.05 mm. Hg pressure. The slightly-yellow solid (35% yield) melts at 73°–74° C.

ANALYSIS

|  | C | H |
|---|---|---|
| Calculated for C$_8$H$_4$Cl$_2$ | 56.0 | 2.4 |
| Actual | 56.3 | 3.0 |

The infrared spectrum is consistent with the assigned structure

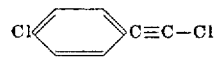

EXAMPLE 2

*Preparation of 2-Chloroethynyl Benzene*

A solution of dichloroacetylene in ether is prepared employing the process of Example 1. The Grignard reagent, C$_6$H$_5$MgCl, is prepared by reacting C$_6$H$_5$Cl with magnesium in a mixture of ethyl ether and tetrahydrofuran.

A solution of C$_6$H$_5$MgBr in ether and tetrahydrofuran is added to an approximately stoichiometric amount of C$_2$Cl$_2$ in an ethyl ether solution at a rate to maintain a gentle reflux of ether. The addition is stopped when the test for the presence of a Grignard reagent becomes negative. The product is heated and the unreacted C$_2$Cl$_2$·Et$_2$O is distilled off. The residue is treated with a concentrated aqueous solution of NH$_4$Cl and the ether layer dried and distilled. The yield of C$_6$H$_5$C≡C—Cl, having a boiling point of 72°–74° C. at 15 mm. Hg, is 70%.

ANALYSIS

|  | C | H |
|---|---|---|
| Calculated for C$_8$H$_5$Cl | 70.4 | 3.7 |
| Actual | 70.7 | 3.8 |

Infrared analysis confirms the assigned structure:

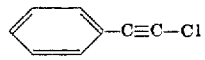

EXAMPLE 3

*Preparation of p-(2-Chloroethynyl)Toluene*

Employing the process of Example 1, a solution of dichloroacetylene in ethyl ether is prepared. The Grignard reagent, p-CH$_3$C$_6$H$_4$MgBr, is prepared by reacting p-CH$_3$C$_6$H$_4$Br with magnesium in ether.

A solution of 1 mol of p-CH$_3$C$_6$H$_4$MgBr in ethyl ether is added to a solution of approximately 1 mol of C$_2$Cl$_2$ in ethyl ether according to the process of Example 2, yielding 12% of p-CH$_3$C$_6$H$_4$C≡C—Cl having a boiling point of 93°–95° C. at 18 mm. Hg; $n_D^{25}$=1.5700. The infrared spectrum is consistent with the assigned structure:

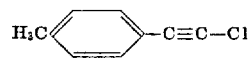

EXAMPLE 4

*Preparation of α-(2-Chloroethynyl)Naphthalene*

The Grignard reagent, α-C$_{10}$H$_7$MgBr, is prepared by reacting α-C$_{10}$H$_7$Br with magnesium in ethyl ether. A solution of the Grignard reagent in ethyl ether is added to a solution of an approximately equimolar amount of C$_2$Cl$_2$ in ether according to the method of Example 2, yielding 30% of α-C$_{10}$H$_7$C≡C—Cl having a melting point of 0° C.

ANALYSIS

|                                  | C    | H   |
|----------------------------------|------|-----|
| Calculated for $C_{12}H_7Cl$     | 77.2 | 3.8 |
| Actual                           | 75.9 | 4.2 |

The infrared spectrum is consistent with the assigned structure:

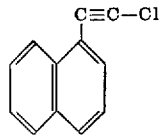

EXAMPLE 5

*Preparation of m-(2-Chlorethynyl)Chlorobenzene*

After initiation of the reaction with the aid of several iodine crystals, m-bromochlorobenzene (50 g., 0.26 mol) in 200 ml. of ether is added to magnesium turnings (8 g., 0.33 mol) over a two-hour period. The mixture is refluxed for an additional one-half hour, allowed to cool to room temperature and filtered. Titration indicates that the Grignard reagent has formed in 99% yield.

The Grignard reagent (0.253 mol, 250 ml.) is added with stirring to an ether solution of dichloroacetylene (0.243 mol, 58 ml.) over a two-hour period. The usual work-up gives 39.2 g. of a dark brown oil. In a second run, using an identical procedure, 35.1 g. of the dark brown oil is obtained. By combining these fractions and distilling twice through a 6-inch packed column, 27.7 g. of m-(2-chloroethynyl)chlorobenzene is obtained; B.P. 50°–51° C. at 0.6 mm. Hg pressure; $n_D^{25}=1.5888$.

|                                | C    | H   | Cl   |
|--------------------------------|------|-----|------|
| Calculated for $C_8H_4Cl_2$    | 56.2 | 2.4 | 41.5 |
| Actual                         | 56.2 | 2.4 | 41.6 |

EXAMPLE 6

*Preparation of p-(2-Chloroethylnyl)Anisole*

After initiation of the reaction with the aid of several iodine crystals, p-bromoanisole (56.0 g., 0.30 mol) in 200 ml. of ether is added to magnesium turnings (9.0 g., 0.37 mol) over a two-hour period. The mixture is refluxed an additional one-half hour and allowed to cool to room temperature. The two layers are filtered through an all glass system and the total filtrate added to an ether solution of dichloroacetylene (65 ml., 0.27 mol) over a four-hour period. After refluxing an additional hour, the mixture is allowed to stand overnight at room temperature. The usual work-up produces 38.5 g. of a dark brown oil which on distillation through a 6-inch packed column gives 7.7 g. of product; B.P. 75° C. at 0.9 mm. Hg pressure; $n_D^{27}=1.5829$.

ANALYSIS

|                                | C    | H   |
|--------------------------------|------|-----|
| Calculated for $C_9H_7ClO$     | 64.9 | 4.2 |
| Actual                         | 64.7 | 4.4 |

EXAMPLE 7

*Preparation of p-(2-Chloroethynyl)Fluorobenzene* p-Bromofluorobenzene (53 g., 0.30 mol) in 200 ml. of ether is added to magnesium turnings (10 g., 0.42 mol) during a one and one-half hour period. After the addition, the mixture is refluxed for one-half hour and allowed to stand overnight at room temperature. After filtration, a titration indicates that the Grignard reagent has formed in 86% yield.

The Grignard reagent (0.251 mol, 215 ml.) is added to an ether solution of dichloroacetylene (0.246 mol, 59 ml.) during a four-hour period. The usual work-up gives 30.8 g. of a brown-black oil which on distillation through a 6-inch packed column gives 14.5 g. of p-(2-chloroethylnyl)fluorobenzene; B.P. 58°–59° C. at 6.0 mm. Hg pressure; $n_D^{21}=1.5470$.

ANALYSIS

|                              | C    | H   |
|------------------------------|------|-----|
| Calculated for $C_8H_4ClF$   | 62.1 | 2.6 |
| Actual                       | 61.7 | 3.1 |

EXAMPLE 8

*Preparation of p-(2-Chloroethylnyl) Chlorobenzene From Styrene*

Styrene monomer (305 g., 2.93 mol) is dissolved in 1200 ml. $CCl_4$ and placed in a flask fitted with gas inlet tube, stirrer and condenser. While maintaining the temperature between 40° and 50° C., gaseous chlorine (230 g., 3.24 mol) is admitted until the solution turns from colorless to yellow. The solution is then irradiated externally with two 15-watt G.E. blue fluorescent lamps and the chlorination continued until a total of 423 g. (5.94 mol) of $Cl_2$ has been admitted.

The solution is cooled to room temperature, washed with sodium bicarbonate solution, water, and saturated sodium chloride solution. After drying over anhydrous sodium sulfate and removing solvent at reduced pressure, 607 g. of a light yellow oil is obtained.

Distillation at reduced pressure removes 189 g. of underchlorinated material (B.P. <126°/10.5 mm. Hg). The remaining crude trichloroethylbenzene (344 g., 1.64 mol) is mixed with one liter of $CCl_4$ and a catalytic amount (5.4 g.) of anhydrous ferric chloride and placed in the chlorination apparatus described above. While maintaining the temperature at 50°–55° C., gaseous chlorine (128 g., 1.80 mol) is admitted. Nitrogen is then blown through the warm solution for one-half hour to remove unreacted chlorine.

The solution is cooled to room temperature and washed with 6 N HCl to remove the $FeCl_3$ and finally with water. Benzene is added to the solution and a small amount of water, ca. 2 ml., removed by azeotropic distillation. After removal of the remaining solvent by distillation at reduced pressure, 390 g. of a dark brown oil remains. Distillation at reduced pressure gives 115 g. of a colorless oil; B.P. 125°–133° C. at 5 mm. Hg; $n_D^{20}=1.5741$.

ANALYSIS

|                                | C    | H   | Cl   |
|--------------------------------|------|-----|------|
| Calculated for $C_8H_6Cl_4$    | 39.4 | 2.5 | 58.1 |
| Actual                         | 39.8 | 2.7 | 58.3 |

A representative sample of tetrachloroethyl benzene (3.0 g., 0.0123 mol) in 7 ml. ethanol is added dropwise to 12 ml. of an ethanolic solution of sodium ethylate prepared from 1.2 g. of sodium (0.05 mol). After refluxing for one and one-half hours, the mixture is cooled to room temperature and poured into ice water. The organic product is taken into ether/benzene, washed till neutral and dried by filtration through anhydrous sodium sulfate. After removal of solvents at reduced pressure, a yellow solid is obtained. Recrystallization from isopropanol gives 0.6 g. of a yellow crystalline solid, M.P. 72°–74° C.

ANALYSIS

|                                | C    | H   | Cl   |
|--------------------------------|------|-----|------|
| Calculated for $C_8H_4Cl_2$    | 56.2 | 2.4 | 41.5 |
| Actual                         | 56.5 | 2.7 | 40.6 |

Preparation of ethynyl mesitylene ($C_{11}H_{12}$) and 4-ethynyl-m-xylene ($C_{10}H_{10}$) is described in an article by Vaughn and Nieuwland appearing in vol. 56, Journal of American Chemical Society, page 1207 (1930). Preparation of p-chlorophenyl phenylacetylene is described in an article by Newman and Reid in vol. 23 of the Journal of Organic Chemistry at page 665 (1958).

EXAMPLE 9

In testing insecticidal action against the Mexican bean beetle, the basic formulation contains 0.2% or 2000 p.p.m. of the test chemical, 4% acetone, .01% Triton X-155 and the balance water. When lower concentrations of the test chemical are employed, the solvent and emulsifier concentrations are maintained.

Fourth instar larvae of the Mexican bean beetle (*Epilachna varivestis*) less than one-day-old within the instar is the test species. Paired fully-expanded seed leaves excised from Tendergreen bean plants are dipped in the test formulation and agitated until they are thoroughly wetted. The chemical deposited on the leaves is then dried and the paired leaves are then separated. The drying is accomplished first by placing the excised stem in water to prevent wilting and held in a hood with the fan operating. One leaf is placed into each of two Dixie cups (5 oz.) and 10 randomly-selected larvae are counted into each Dixie cup which is then covered with a 9 cm. Petri dish cover. These are held at 70° F. for three days when mortality and feeding inhibition are determined. The feeding inhibition is an indication of the repellent properties of the test material. At a concentration of 1000 p.p.m., p-chlorophenyl phenylacetylene exhibits a mortality of 90% and at a concentration of 500 p.p.m., 25% mortality is shown.

EXAMPLE 10

In testing insecticidal action against roaches, a formulation similar to that of Example 9 is employed. Twenty adult males, 7 to 9 weeks old, anesthetized with carbon dioxide, are counted into 150-ml. bakers. Seventy-five ml. of formulated chemical are poured into a beaker containing the roaches. The contents of the roach beaker are immediately poured back into the formulation beaker. This sloshing is repeated three more times and the roaches are immediately screened on a copper screen wire and drained a few seconds on towel paper. Ten of the treated roaches are counted into each of two Dixie cups (3¼" diameter x 1¼" deep) which are then capped with Petri dish covers. Mortality counts are made three days after treatment. At a concentration of 500 p.p.m., p-chlorophenyl phenylacetylene exhibits a mortality of 50% and at a concentration of 125 p.p.m., p-(2-chloroethynyl)-chlorobenzene exhibits a mortality of 65%.

EXAMPLE 11

Adult two-spotted spider mites, *Tetranychus bimaculatus*, maintained on Tendergreen beans under controlled conditions are used as the test species. Young bean plants, 3 to 4 inches tall, thinned to two plants per 2½-inch pot, are treated by pouring a formulation (2000 p.p.m. ethynyl mesitylene—5% acetone—0.01% Triton X-155—balance water) on the soil at the equivalent rate of 64 lbs./acre. Twenty-four hours later, the four seed leaves in each pot are infested by leaf cuttings from Tendergreen bean plants infested with the said spider mite. Counts are recorded two or three days after the plants are infested showing 57% mortality.

EXAMPLE 12

To measure the ability of test chemicals to inhibit the germination of sclerotia of *Sclerotium rolfsii*, black blotting paper pads (2" x 2") are placed in a 200 p.p.m. formulation diluted from a basic formulation containing 0.4 ml. of p-(2-chloroethynyl)anisole, 8 ml. acetone, 4 ml. stock emulsifier solution (0.5% Triton X-155 by volume) and 187.6 ml. distilled water. Each pad retains 2 ml. of formulation; therefore, approximately 400 μg. of chemical is impregnated on or adheres to each pad. Control pads are placed in water in the same manner. Twenty sclerotia are evenly placed on each pad which is then inserted into an 8-ounce, wide-mouthed, screw-cap bottle on a wire screen which is cut to rest in the middle of the bottle. The cap is replaced to retain a moist atmosphere and the bottle is placed in a horizontal position. After 48 hours at room temperature, inhibition of germination is recorded by classes as follows: 0=complete inhibition; 1=slight growth; 2=moderate growth; 3=heavy growth equal to controls. The inhibition index is calculated in the folling manner:

Inhibition index $$= \frac{\text{Sum of products of number of sclerotia in each class} \times \text{respective class value} \times 100}{3 \times \text{total number of sclerotia}}$$

The inhibition index value is reported as a control index where 0 indicates no biological activity and 100 equals complete inhibition of sclerotial germination. The control index is arrived at by subtracting the inhibition index from 100. Using this procedure, p-(2-chloroethynyl)-anisole exhibits a control index of 100.

EXAMPLE 13

Inhibition of spore germination on glass slides by the test tube dilution method is adopted from the procedure recommended by the American Phytopathological Society's Committee on Standardization of Fungicidal Tests (1). In this screen, chemicals at 1000, 100, 10 and 1.0 p.p.m. are tested for ability to inhibit germination of spores from 7- to 10-day-old cultures of *Alternaria oleracea* Mil. and *Monilinia fructicola* (Wint.) Honey. These concentrations refer to the actual concentrations after diluting the test preparations with spore stimulant and spore suspension. A formulation comprising 0.1 g. or 0.1 ml. of test chemical, 4 ml. acetone, 2 ml. stock emulsifier solution (0.5% Triton X-155 in water by volume) and 74 ml. distilled water (concentration of toxicant—1250 p.p.m.) is used for this test. The concentrations given above are diluted from this original formulation and the concentration of emulsifier and acetone is not maintained. Germination records are taken after 20 hours of incubation at 22° C. by observing several miscroscope fields so that at least 100 spores of each fungus have been examined at each concentration. Copper sulfate is used as a standard reference material. Test compounds are given alphabetical ratings which correspond to the concentration that inhibits germination of half the spores ($ED_{50}$) in the test drops: AAA=0.01 to 0.1 p.p.m.; AA=0.1 to 1.0 p.p.m.; A=1.0 to 10 p.p.m.; B=10 to 100 p.p.m.; C=100 to 1000 p.p.m.; and D=1000 p.p.m. Using this procedure, ethynyl mesitylene, m-(2-chloroethynyl)chlorobenzene and p-(2-chloroethynyl)anisole receive ratings equal to or greater than AA.

EXAMPLE 14

Soil known to be infested with seed decay and damping-off fungi placed in 4" x 4" x 3" plant band boxes and treatment is accomplished by drenching the soil with 74.25 ml. of a formulation containing 0.4 ml. of the test compound, 8 ml. acetone, 4 ml. stock emulsifier solution (0.5% Triton X-155 by volume) and 187.6 ml. distilled water or 148.5 mg. of active chemical. The plant band boxes have a surface area of 16 square inches and 1.16 mg.=1 pound per acre. One day after treatment, soil is removed from each box and thoroughly mixed in a five-pound paper bag and then replaced in the box. Three days after drenching, 25 pea seeds, var. Perfection, are planted in each box. From the time of treatment until the pea seeds begin to emerge, the boxes are held at 20° C. in a controlled temperature cabinet. Untreated checks and a standard material are included in each test in addition to a check planted in sterilized soil. After seed emergence the box is removed to the greenhouse bench and percentage stand is recorded 14 days after planting. Using this procedure, p-(2-chloroethynyl) fluorobenzene exhibits 68% control of the fungi.

EXAMPLE 15

The tomato foliage disease test measures the ability of the test compound to protect tomato foliage against infection by the early blight fungus *Alternaria solani* (Ell. and Mart.) Jones and Grout. The method used is a modification of that described by McCallan and Wellman and employs tomato plants (var. Bonny Best), 5 to 7 inches high, which are 4 to 6 weeks old. In the primary test, duplicate plants, one set for each test fungus, are sprayed with 100 ml. of a formulation containing 0.4 g. of the test compound, 8 ml. acetone, 4 ml. stock emulsifier solution (0.5% Triton X–155 by volume) and 187.6 ml. distilled water at 2000 and 400 p.p.m., at 40 pounds air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml. The atomizer used delivers 20 ml. in the 30-second exposure period. The plants are held in a saturated atomsphere for 24 hours at 70° F. for early blight to permit spore germination and infection before removal to the greenhouse.

After two days from the start of the test for early blight, lesion counts are made on the three uppermost fully-expanded leaves. The data are converted to percentage disease control based on the number of lesions obtained on the control plants. Using this procedure, α-(2-chloroethynyl)naphthalene exhibits 94% disease control at 2000 p.p.m. and 75% disease control at 400 p.p.m.

EXAMPLE 16

One week after a drench treatment of tomato plants two to three weeks old, growing in four-inch clay pots, they are exposed to the early blight fungus in the same manner as previously described in Example 15. After 48 hours, lesion counts are made and converted to percentage disease control based on check plants. The amounts of chemical applied are 56 ml. and 28 ml. of the basic formulation of Example 15, which are equivalent to 112 mg. or 128 pounds per acre, and 56 mg. or 64 pounds per acre, respectively. Using this procedure, 2-chloroethynylbenzene exhibits 93% disease control at 128 lbs./acre and 56% disease control at 64 lbs./acre.

EXAMPLE 17

Pinto bean plants at a growth stage when the trifoliate leaves are just beginning to emerge from the axil of the seed leaves are used as the test species. These plants are grown in 4-inch pots and thinned to three plants per pot. Usually the plants are about 10 to 14 days old from time of planting. There are, therefore, six primary seed leaves per pot for each test unit. As in Example 16, 56 ml. and 28 ml. of the basic formulation are drenched on each pot which are equivalent to 112 mg. and 56 mg. of chemical or 128 pounds and 64 pounds per acre, respectively. About two or three hours after treatment, a spore suspension of bean rust is applied to the bean leaves in the same manner as described above for the tomato foliage disease test. After exposure, plants are immediately placed in a moist chamber in a saturated atmosphere at 60° F. for 24 hours after which they are removed to the greenhouse. The rust spore suspension is prepared with one part of rust spores, 16 parts of talc, and 26,000 parts of water. Counts are made about 10 days after spore exposure and the mean number of rust pustules per leaf is determined. These counts are calculated against the check counts to arrive at the percentage disease control. Using the procedure of this test, ethynyl mesitylene exhibits 48% disease control at 64 lbs./acre; 4-ethynyl-m-xylene exhibits 58% disease control at 128 lbs./acre; and p-(2-chloroethynyl)chlorobenzene exhibits 72% disease control at 64 lbs./acre.

EXAMPLE 18

Test chemicals are examined for ability to inhibit the growth of four bacterial species (*Erwinia amylovora* (E.a.), *Xanthomonas phaseoli* (X.p.), *Micrococcus pyrogenes* var. *aureus* (S.a.) and *Escherechia coli* (E.c.) at concentrations of 250, 100, 64, 32 and 16 p.p.m. The basic formulation containing 0.1 g. or 0.1 ml. of test chemical, 4 ml. acetone, 2 ml. stock emulsifier solution (0.5% Triton X–155 by volume) and 74 ml. distilled water is diluted to the desired concentration without maintaining the concentration of emulsifier or solvent. All of the bacterial species are cultured on nutrient agar slants except *X. phaseoli* which is grown on potato dextrose agar.

The cultures used for tests are sub-cultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard four mm. platinum loop to 7 ml. of sterile broth into test tubes arranged in racks similar to those for the medication tubes. The broth tubes are then incubated for 48 hours at 29° to 31° C., at which time growth is measured by use of a Bausch & Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks.

Using this procedure, the following results are obtained:

| Test Chemical | Concentration (p.p.m.) | Percent Control ||||
|---|---|---|---|---|---|
| | | E.a. | X.p. | S.a. | E.c. |
| 2-chloroethynylbenzene | 250 | 100 | 100 | 80 | 58 |
| | 100 | 85 | 100 | 77 | 47 |
| p-(2-chloroethynyl) toluene | 100 | 83 | 100 | 100 | 50 |
| | 64 | | 71 | | 44 |
| | 32 | | 24 | | 40 |
| m-(2-chloroethynyl)chlorobenzene | 250 | 100 | 100 | 100 | |
| | 64 | 100 | 67 | 100 | |
| p-(2-chloroethynyl)anisole | 64 | 100 | 100 | 100 | 36 |
| p-(2-chloroethynyl)fluorobenzene | 32 | 100 | 100 | 100 | 33 |
| | 16 | 71 | 74 | 100 | |

EXAMPLE 19

To measure the growth-regulating and herbicidal responses when chemicals are absorbed by roots and translocated, tomato plants, var. Bonny Best, 5 to 7 inches tall, and beans, variety Tendergreen, just as the trifoliate leaves are beginning to unfold, are treated by drenching a formulation containing 0.4 g. or 0.4 ml. of the test chemical, 8 ml. acetone, 4 ml. stock emulsifier solution (0.5% Triton X–155 by volume) and 187.6 ml. distilled water (concentration of test chemical—2000 p.p.m.) on soil in clay pots containing the test plants. One tomato growing in a four-inch pot and four Tendergreen bean plants growing in a 3½-inch pot are treated with 28 ml. and 21 ml. of the 2000 p.p.m. formulation. This is equivalent to 64 lbs./acre or 56 mg. and 42 mg. of chemical per pot, respectively. Plants are held in the greenhouse for two weeks before records are taken. Phytotoxicity is rated on a scale from 0 to 11 based on the Weber-Fechner law which states that visual acuity depends on the logarithm of the intensity of the stimulus. In grading phytotoxicity the stimulus changes at the 50% level. The grades are as follows based on percent of leaf area destroyed: 0=no injury; 1=0 to 3; 2=3 to 6; 3=6 to 12; 4=12 to 25; 5=25 to 50; 6=50 to 75; 7=75 to 87; 8=87 to 94; 9=94 to 97; 10=97 to 100, and at 11 the plant is dead. Using this procedure, m-(2-chloroethynyl)chlorobenzene has a phytotoxicity rating of 0 for both the tomato and bean plants. This chemical causes severe stunting of tomato plants, formative effects of the bean plants and cell proliferation of both tomato and bean plants.

EXAMPLE 20

To evaluate the effect of test chemicals upon the germination and subsequent growth of seeds in soil, two mixtures of seed are used. One contains three broadleaf species and the other contains three grass species. Each mixture is planted diagonally in one-half of a 9″ x 9″ x 2″ aluminum cake pan filled to within ½ inch of the top with composted greenhouse soil. After planting, the seed is uniformly covered with about ¼ inch of soil and watered. After 24 hours, 10 ml. and 5 ml. of test formulation containing 167 mg. of toxicant, 20 ml. acetone, 2 drops Triton X–155 and 20 ml. distilled water, is sprayed at 10 p.s.i. uniformly over the surface of the pans. This is equivalent to 8 pounds per acre and 4 pounds per acre, respectively.

The broadleaf seed mixture contains turnip, flax and alfalfa. The grass mixture contains millet, ryegrass and timothy. Two weeks after treatment, estimates are made on seedling stand and percent control is calculated. At a concentration of 8 lbs./acre, m-(2-chloroethynyl)chlorobenzene shows 76% control on broadleaves and 42% control on grasses. At a concentration of 4 lbs./acre the same chemical shows 68% control of the broadleaf seeds and 45% control on the grass mixture.

EXAMPLE 21

Composted greenhouse soil diluted by one-third with clean, washed sand is placed in ½-gallon glazed crocks and infested with 3 to 5 g. of knotted or galled tomato roots. Treatment is accomplished by mixing the test chemical intimately with the soil, if a solid, or by drenching if a liquid, paste, or of gummy consistency. The mixing of the solid test chemicals is accomplished by placing the infested soil and the chemical in a 20-pound paper bag and mixing thoroughly. The soil is then replaced into the crock to which is added 100 ml. of water. In the case of the drench treatment, the chemicals are mixed after two to three days as described above via the paper bag method. After treatment all crocks are stored at 20° C. where they are covered with plastic to maintain moisture. Seven days after treatment, three seedling Bonny Best tomatoes are transplanted into each crock. After three weeks in the greenhouse the plants are removed from the soil carefully and roots are inspected for nematode galls. A rating of infection from 0 to 10 is recorded: 0=no galls or complete control and 10=heavily galled roots comparable to controls. Each of the three plant root systems is rated separately and the average is multiplied by 10 and subtracted from 100 to give percent nematode control. The percent nematode kill for the compounds of the invention are as follows:

| Test Chemical | Rate of Application, lbs./ acre (Area basis) | Percent Nematode Kill |
|---|---|---|
| 2-chloroethynylbenzene | 256 | 100 |
| p-chlorophenyl phenylacetylene | 64 | 80 |
| | 128 | 97 |
| | 64 | 57 |
| p-(2-chloroethynyl)chlorobenzene | 128 | 100 |
| | 64 | 100 |
| | 32 | 100 |
| | 16 | 100 |
| | 8 | 93 |
| m-(2-chloroethynyl)chlorobenzene | 256 | 100 |
| | 32 | 50 |
| p-(2-chloroethynyl)anisole | 256 | 100 |
| p-(2-chloroethynyl)fluorobenzene | 128 | 100 |
| | 32 | 50 |

EXAMPLE 22

Nonplant parasitic nematodes (*Panagrellus redivivus*) are exposed to the test chemical in small watch glasses, U.S. Bureau of Plant Industry's model, 27 mm. diameter x 8 mm. deep, within a 9 cm. Petri dish. Three watch glasses are used; two of these receive 0.4 ml. of the test formulation containing 0.1 g. or 0.1 ml. of the test compound, 4 ml. acetone, 2 ml. stock emulsifier solution (0.5% Triton X–155 by volume) and 74 ml. distilled water, at 1250 p.p.m. and the third, which is in the center between the others, receives 0.4 ml. of distilled water. After all of the test dishes have been set up in this manner, a 0.1 ml. of Panagrellus suspension is added to each watch glass bringing the concentration down to exactly 1000° p.p.m. After these additions are made, the Petri dishes are closed. The watch glass in the center of each dish, containing only water and nematodes, detects fumigant action. The other two containing chemical and nematodes measure contact activity. The total amount of toxicant in the Petri dish is one mg. for fumigant action. A one to ten dilution is made of the 1250 p.p.m. formulation for the lower concentration.

The organism is grown on cooked oatmeal which is sterilized in the autoclave before being centrally inoculated from an old culture. The culture is held at 220° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this test procedure, the compound p-(2-chloroethynyl)chlorobenzene shows 100% nematode mortality at concentrations of 1000 p.p.m. and 100 p.p.m.

It is to be understood that although the invention has been described with specific reference to particular embodiments thereof, it is not to be so limited, since changes and alterations therein may be made which are within the full intended scope of this invention as defined by the appended claims.

What is claimed is:

1. A biologically-active composition of matter comprising 0.1% to 15% by weight of a surface active agent, 0.5% to 85% by weight of a compound of the structure:

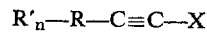

wherein R is selected from the group consisting of

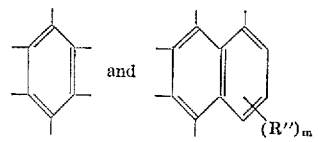

R′ and R″ are selected from the group consisting of halogen, lower alkyl and lower alkoxy; n is a number from 0 to 5, inclusive; X is selected from the group consisting of hydrogen, halogen and phenyl; m is a number from 0 to 2, inclusive; and any free bonds are satisfied by hydrogen and the balance a carrier.

2. A biologically-active composition of matter comprising 0.1% to 15% by weight of a surface active agent, 0.5% to 85% by weight of a compound of the structure:

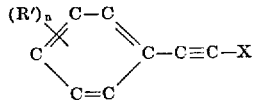

wherein R' is selected from the group consisting of halogen, lower alkyl and lower alkoxy; n is a number from 0 to 5, inclusive; X is selected from the group consisting of hydrogen, halogen and phenyl; and any free bonds are satisfied by hydrogen, and the balance a carrier.

3. A biologically-active composition of matter comprising a major portion of a carrier and as an essential active ingredient a compound of the structure:

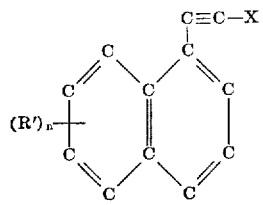

wherein R' is selected from the group consisting of halogen, lower alkyl and lower alkoxy; n is a number from 0 to 7, inclusive; X is selected from the group consisting of hydrogen, halogen and phenyl; and any free bonds are satisfied by hydrogen.

4. The method of killing plant parasites which comprises contacting said parasites with a biologically-active amount of a compound of the structure:

$$R'_n—R—C \equiv C—X$$

wherein R is selected from the group consisting of

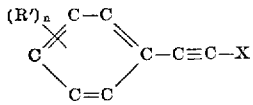

R' and R" are selected from the group consisting of halogen, lower alkyl and lower alkoxy; n is a number from 0 to 5, inclusive; m is a number from 0 to 2, inclusive; X is selected from the group consisting of hydrogen, halogen and phenyl; and any free bonds are satisfied by hydrogen.

5. The method of killing insects which comprises contacting said insects with an insecticidal amount of a compound having the structure:

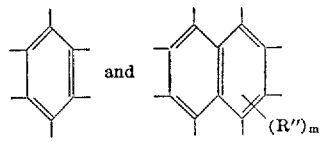

wherein R' is selected from the group consisting of halogen and lower alkyl; n is a number from 0 to 5, inclusive; X is selected from the group consisting of hydrogen, halogen and phenyl; and any free bonds are satisfied by hydrogen.

6. The method of killing insects which comprises contacting said insects with an insecticidal amount of a compound selected from the group consisting of ethynyl mesitylene, p-chlorophenyl phenylacetylene and p-(2-chloroethylnyl)chlorobenzene.

7. The method of killing insects which comprises contacting said insects with an insecticidal amount of ethynyl mesitylene.

8. The method of killing insects which comprises contacting said insects with an insecticidal amount of p-chlorophenyl phenylacetylene.

9. The method of killing insects which comprises contacting said insects with an insecticidal amount of p-(2-chloroethynyl)chlorobenzene.

10. The method of killing fungi which comprises contacting said fungi with a fungicidal amount of a compound of the structure:

$$R'_n—R—C \equiv C—X$$

wherein R is selected from the group consisting of

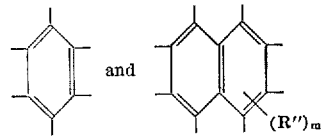

R' and R" are selected from the group consisting of halogen, lower alkyl and lower alkoxy; n is a number from 0 to 5, inclusive; m is a number from 0 to 2, inclusive; X is selected from the group consisting of hydrogen and halogen; and any free bonds are satisfied by hydrogen.

11. The method of killing fungi which comprises contacting said fungi with a fungicidal amount of a compound selected from the group consisting of 2-chloroethynylbenzene, ethynyl mesitylene, 4-ethynyl-m-xylene, p-(2-chloroethynyl)chlorobenzene, α-(2 - chloroethynyl)- naphthalene, m - (2 - chloroethynyl)chlorobenzene, p-(2-chloroethynyl)anisole and p-(2-chloroethynyl)fluorobenzene.

12. The method of killing fungi which comprises contatcting said fungi with a fungicidal amount of 2-chloroethynylbenzene.

13. The method of killing fungi which comprises contacting said fungi with a fungicidal amount of ethynyl mesitylene.

14. The method of killing fungi which comprises contacting said fungi with a fungicidal amount of 4-ethynyl-m-xylene.

15. The method of killing fungi which comprises contacting said fungi with a fungicidal amount of p-(2-chloroethynyl) chlorobenzene.

16. The method of killing fungi which comprises contacting said fungi with a fungicidal amount of α-(2-chloroethynyl) naphthalene.

17. The method of killing fungi which comprises contacting said fungi with a fungicidal amount of m-(2-chloroethynyl) chlorobenzene.

18. The method of killing fungi which comprises contacting said fungi with a fungicidal amount of p-(2-chloroethynyl) anisole.

19. The method of killing fungi which comprises contacting said fungi with a fungicidal amount of p-(2-chloroethynyl) fluorobenzene.

20. The method of killing bacteria which comprises contacting said bacteria with a bactericidal amount of a compound of the structure:

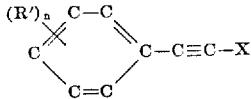

wherein R' is selected from the group consisting of halogen, lower alkyl and lower alkoxy; n is a number from 0 to 5, inclusive; X is halogen; and any free bonds are satisfied by hydrogen.

21. The method of killing bacteria which comprises contacting said bacteria with a bactericidal amount of a compound selected from the group consisting of 2-chloroethynylbenzene, p-(2-chloroethynyl)toluene, m-(2-chloroethynyl)chlorobenzene, p-(2 - chloroethynyl)anisole and p-(2-chloroethynyl)fluorobenzene.

22. The method of killing bacteria which comprises contacting said bacteria with a bactericidal amount of 2-chloroethynylbenzene.

23. The method of killing bacteria which comprises contacting said bacteria with a bactericidal amount of p-(2-chloroethynyl)toluene.

24. The method of killing bacteria which comprises contacting said bacteria with a bactericidal amount of m-(2-chloroethynyl)chlorobenzene.

25. The method of killing bacteria which comprises contacting said bacteria with a bactericidal amount of p-(2-chloroethynyl)anisole.

26. The method of killing bacteria which comprises contacting said bacteria with a bactericidal amount of p-(2-chloroethynyl)fluorobenzene.

27. The method of killing nematodes which comprises contacting said nematodes with a nematocidal amount of a compound of the structure:

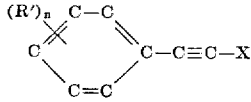

wherein R' is selected from the group consisting of halogen and lower alkoxy; $n$ is a number from 0 to 5, inclusive; X is selected from the group consisting of halogen and phenyl; and any free bonds are satisfied by hydrogen.

28. The method of killing nematodes which comprises contacting said nematodes with a nematocidal amount of a compound selected from the group consisting of 2-chloroethynylbenzene; p-chlorophenyl phenylacetylene; p-(2-chloroethynyl)chlorobenzene; m-(2-chloroethynyl)-chlorobenzene; p-(2-chloroethynyl)anisole and p-(2-chloroethynyl)fluorobenzene.

29. The method of killing nematodes which comprises contacting said nematodes with a nematocidal amount of 2-chloroethynylbenzene.

30. The method of killing nemadoes which comprises contacting said nematodes with a nematocidal amount of p-chlorophenyl phenylacetylene.

31. The method of killing nematodes which comprises contacting said nematodes with a nematocidal amount of p-(2-chloroethynyl)chlorobenzene.

32. The method of killing nematodes which comprises contacting said nematodes with a nematocidal amount of m-(2-chloroethynyl)chlorobenzene.

33. The method of killing nematodes which comprises contacting said nematodes with a nematocidal amount of p-(2-chloroethynyl)anisole.

34. The method of killing nematodes which comprises contacting said nematodes with a nematocidal amount of p-(2-chloroethynyl)fluorobenzene.

References Cited in the file of this patent
UNITED STATES PATENTS

| | | |
|---|---|---|
| 2,657,244 | Barney et al. | Oct. 27, 1953 |
| 2,777,793 | Neumoyer | Jan. 15, 1957 |
| 2,824,144 | Beets et al. | Feb. 18, 1958 |
| 2,904,421 | Seaton | Sept. 15, 1959 |
| 2,943,016 | Rosen et al. | June 28, 1960 |
| 2,977,211 | Godfrey | Mar. 28, 1961 |

OTHER REFERENCES

Woodcock: J. Chem. Soc., 1949, pp. 203–206.

UNITED STATES PATENT OFFICE
CERTIFICATE OF CORRECTION

Patent No. 3,113,068            December 3, 1963

John H. Wotiz

It is hereby certified that error appears in the above numbered patent requiring correction and that the said Letters Patent should read as corrected below.

Column 5, before line 35, insert -- ANALYSIS --; column 7, line 40, for "bakers" read -- beakers --; column 12, lines 71 to 74, the structure should appear as shown below instead of as in the patent:

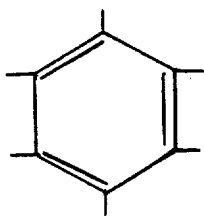 and 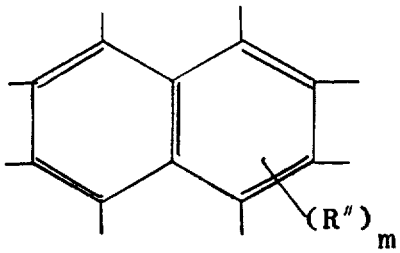

column 14, line 31, for "tatcting" read -- tacting --.

Signed and sealed this 14th day of July 1964.

(SEAL)
Attest:

ESTON G. JOHNSON

Attesting Officer

EDWARD J. BRENNER

Commissioner of Patents